United States Patent [19]

Ito et al.

[11] Patent Number: 4,677,495
[45] Date of Patent: Jun. 30, 1987

[54] ORIGINAL READING APPARATUS

[75] Inventors: Yoshio Ito, Tokyo; Masaaki Nishikawa, Yokohama, both of Japan

[73] Assignee: Canon Kabushiki Kaisha, Tokyo, Japan

[21] Appl. No.: 823,074

[22] Filed: Jan. 27, 1986

[30] Foreign Application Priority Data

Jan. 30, 1985 [JP] Japan ................... 60-15713
Jan. 30, 1985 [JP] Japan ................... 60-15714

[51] Int. Cl.⁴ .............................................. H04N 1/04
[52] U.S. Cl. ..................................... 358/285; 358/293
[58] Field of Search ............... 358/199, 256, 285, 293, 358/294, 213

[56] References Cited

U.S. PATENT DOCUMENTS 3,413,411 11/1968 Stanffer ........................ 358/256
4,084,188 4/1978 Gorog et al. .................... 358/199
4,196,455 4/1980 Brooke ........................... 358/285 X
4,415,981 11/1983 Cutter et al. .................... 358/256 X
4,520,400 5/1985 Koumura ........................ 358/256 X
4,571,636 2/1986 Itoh ................................ 358/285

FOREIGN PATENT DOCUMENTS 469013 11/1928 Fed. Rep. of Germany ...... 358/199

Primary Examiner—Edward L. Coles, Sr.
Attorney, Agent, or Firm—Fitzpatrick, Cella, Harper & Scinto

[57] ABSTRACT

The light from an original is reflected by first, second and third mirrors in succession. The light from the third mirror is imaged on an image sensor by a lens. The second mirror, as compared with the first and third mirrors, is disposed far from an original illuminating light source. The optical path among the first, second and third mirrors and the lens is a zigzag.

2 Claims, 2 Drawing Figures

ORIGINAL READING APPARATUS

BACKGROUND OF THE INVENTION

1. Field of the Invention

This invention relates to an original reading apparatus for converting the image information of an original to be read into an electrical signal.

2. Description of the Prior Art

Use is made of original reading apparatuses of the type in which an original to be read is illuminated by a tubular illuminating light source such as a fluorescent lamp and is read and scanned while being conveyed by a conveyor roller or the like.

As an example of the reading apparatus of this type according to the prior art, use is made of an apparatus of a structure in which a light source having a length substantially equal to the width of an original to be read conveyed in a horizontal direction is disposed below and near the original to be read, the downward, or vertical, optical axis is changed to a horizontal direction by a mirror disposed below the light source, and the image of the original is formed on an image sensor via a lens disposed in the rear portion of the apparatus.

However, to secure a predetermined length of optical path in such conventional structure, the distance between the mirror and the lens must be made long, and this leads to a problem that the length of the optical system becomes great and the apparatus becomes bulky.

So, there has heretofore been proposed an optical system in which a second mirror for turning back the horizontal optical axis from the mirror below the light source is added and the lens is installed below the light soucre, thereby obtaining a length of optical path about double the length of the apparatus.

In such an optical system, however, the length of the apparatus can be reduced, but the lens of a great diameter must be installed below the light source and the mirror and the total height dimension of these becomes great, which leads to a problem that the height of the apparatus increases.

In a reading apparatus using a lens, efforts to shorten the focal length of the lens have been made to achieve the improved resolving power of the optical system and the compactness of the optical system itself, but there is a limit in making the apparatus compact by such efforts.

SUMMARY OF THE INVENTION

It is an object of the present invention to solve the above-noted problems peculiar to the structure of the prior art and to achieve thinness and compactness of an original reading apparatus of the type in which an original to be read is conveyed and which used a lens system.

DESCRIPTION OF THE PREFERRED EMBODIMENT

Figure 1:
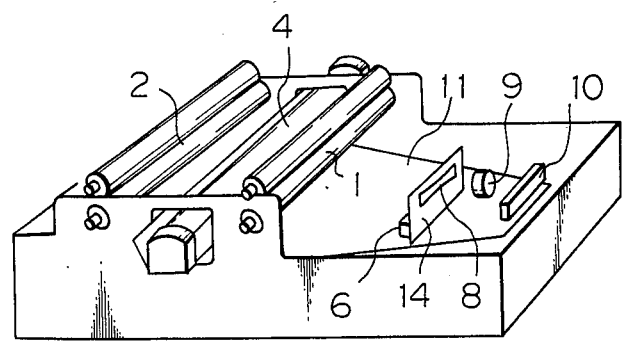
FIG. 1 is a perspective view showing an embodiment of the original reading apparatus according to the present invention with the upper cover thereof removed.
Figure 2:
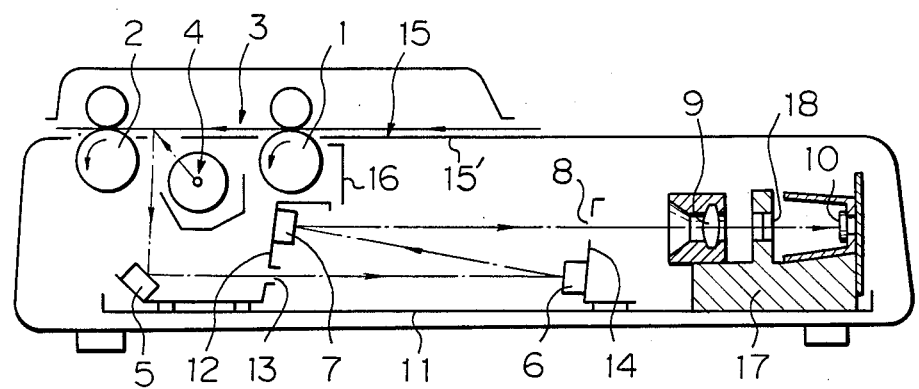
FIG. 2 is a longitudinal cross-sectional view of the central portion of the apparatus of FIG. 1.

Referring to FIGS. 1 and 2, feed rollers 1 and 2 are provided at two locations in the upper portion of an apparatus, an original 3 to be read is horizontally conveyed from right to left by these feed rollers through a conveyance path 15, and a light source 4 such as a tubular fluorescent lamp is disposed below and near the conveyance path 15. This light source is comprised, for example, of a green fluorescent lamp of high illumination with a reflector and illuminates the original 3 to be read over a predetermined width, and the light beam reflected from the original may be directed downwardly (in a direction substantially orthogonal to the direction of conveyance). A first mirror 5 is disposed below and near the light source so that the light from the original 3 is reflected in a direction (horizontal direction) substantially parallel to the direction of conveyance of the original 3 by the first mirror and directed to a second mirror 6.

The light is reflected toward the light source 4 at an upward angle (e.g., 10°-15°) by the second mirror 6 and directed to a third mirror 7 disposed in the space near the light source 4.

The light is again reflected in a direction (horizontal direction) substantially parallel to the direction of conveyance by the third mirror, through a slit 8 to a lens 9 disposed near the second mirror 6, and is imaged on an image sensor 10 (such as a CCS) via the lens 9. The image sensor 10 puts out an electrical signal corresponding to light information received thereby, that is, corresponding to the image information of the original.

As is apparent from the foregoing, the distance (spatial interval) between the second mirror 6 and the light souce 4 is greater than the distance between the first mirror 5 and the light source 4 and the distance between the third mirror 7 and the light source 4. Also, the distance between the lens 9 and the second mirror 6 is shorter than the distance between the lens 9 and the first mirror 5 and the distance between the lens 9 and the third mirror 7. The optical path between the third mirror 7 and the lens 9 or the optical path between the third mirror 7 and the image sensor 10 lies between the original conveyance path 15 and the optical path between the first mirror 5 and the second mirror 6. Accordingly, the optical path from the first mirror 5 to the lens 9 or to the image sensor 10 is a zigzag.

An optical system comprising the mirrors 5, 6, 7, the lens 9, the image sensor 10, etc. is installed on an optical system bed 11.

Specifically, the third mirror 7 is mounted on a support member 12 fixed to the bed 11, and the support member 12 is formed with a slit opening 13 for passing therethrough the light travelling from the first mirror 5 toward the second mirror 6. The second mirror 6 is mounted on a support member 14 formed with a slit opening 8. The member 14 is fixed to the bed 11. The lens 9 and the image sensor 10 are integrally mounted on a support member 17 fixed to the bed 11.

In the embodiment shown, an infrared ray cut filter 18 is disposed between the lens 9 and the image sensor 10 so as to cut a wavelength component such as heat radiation included in the emitted light from the light souce, to protect the image sensor 10.

Now, the light emitted from the light source 4 spreads over 360°. On the other hand, in the optical system, it is necessary to supply only the necessary light to the mirrors and the lens and intercept disturbing light such as stray light with respect to the optical system to the utmost in order to prevent wrong reception of a light signal.

Particularly, where it is desired to make the apparatus compact, effective interception of stray light is necessary, but in the original reading apparatus according to the prior art, a special light-intercepting means has been provided, and this has led to a problem that the structure of the apparatus becomes complicated or the apparatus becomes bulky.

In contrast, in the embodiment shown, the support member 12 is provided between the light source 4 and the third mirror 7 so as to intercept the stray light from the light source, etc. That is, the support member 12 constitutes a light-intercepting plate serving also to support the third mirror.

Further, the support member 14 is provided between the lens 9 and the second mirror 6 so as to intercept the stray light travelling toward the lens 9. That is, the support member 14 constitutes a light-intercepting plate serving also to support the second mirror. In addition, in the embodiment shown, there is provided a light-intercepting plate 16 overhanging from a cover portion 15' forming the path 15 of the original 3 to be read to the vicinity of the support member 12. This light-intercepting plate 16 cooperates with the support member (light-intercepting plate) 12 to more reliably intercept the stray light from the light source 4, etc. and serves also as a member for reinforcing the cover portion 15'.

According to the above-described embodiment, the optic axis from the original 3 to be read is bent trebly and directed to the lens 9, and therefore, the length of the optical path relative to the length of the optical system (the right-to-left length as viewed in the drawing) can be extended approximately three times, and the length of the original reading apparatus can be made correspondingly small.

Also, since the second mirror 6 is disposed near the lens 9 and the third mirror 7 is installed by the utilization of the space below the original conveyance path 15 which is adjacent to the light source 4, it has become possible to dispose the horizontal optical axis leading from the third mirror 7 toward the lens 9 above the horizontal optical axis leading from the first mirror 5 toward the second mirror 6. By such disposition of the optical axis, the height of the optical system can be shortened to a dimension as small as either the distance from the original conveyance path 15 to the first mirror 5, or the height of the lens 9. Accordingly, the height of the apparatus can be made small and the apparatus can be made thin.

Further, since the light-intercepting plates are formed by the utilization of the support member 12 for the third mirror 7 and the support member 14 for the second mirror 6, a light-intercepting structure can be obtained very simply and inexpensively without requiring any extra mechanism and space, and the reliability of the optical system can be improved.

Furthermore, the provision of the light-intercepting plate 16 overhanging from the cover portion 15' forming the path 15 of the original 3 to be read to the vicinity of the support member 12 leads to the possibility of increasing the light-intercepting function and achieving the reinforcing effect of the cover portion 15'.

In the embodiment shown, the optical system is provided below the conveyance path 15 of the original conveyed horizontally from right to left, but alternatively, the optical system may be provided above the conveyance path 15. Also, the optical system is provided upstream of the reading portion (the portion for illuminating the original by the light source 4) with respect to the direction of conveyance of the original, but alternatively, the optical system may be provided downstream of the reading portion.

Further, the present invention is equally applicable to a case where the direction of conveyance of the original 3 to be read is a vertical direction or an inclined direction.

We claim:

1. An original reading apparatus for converting the image information of an original to be read into an electrical signal, said apparatus comprising:

conveying means for conveying the original to be read through a predetermined conveyance path;

a light source for illuminating the original to be read;

first, second and third mirrors for successively reflecting light from the original to be read;

an image sensor for forming an electrical signal corresponding to light information received thereby; and a lens for receiving the light from the original to be read reflected by said third mirror and forming an image of the original to be read on said image sensor;

the distance between said second mirror and said light source being greater than the distance between said first mirror and said light source and the distance between said third mirror and said light source;

an optical path between said third mirror and said lens lying between the optical path between said first mirror and said second mirror and said conveyance path, the distance between said lens and said second mirror being shorter than the distance between said lens and said first mirror and the distance between said lens and said third mirror, said first mirror being disposed downwardly of an original illuminating position by a light source to reflect the light from the original in which the original is illuminated in a direction substantially opposite to said original conveyance direction, said second mirror reflecting the light from said first mirror obliquely upwardly, and said third mirror being disposed at a side where said lens and said imge sensor are located relative to the light path between the original illuminating position and said second mirror to reflect the light from said second mirror in a direction substantially opposite to the original conveyance direction.

2. An apparatus according to claim 1, further comprising:

a first light-intercepting member supporting said third mirror and having an opening through which the light reflected by said first mirror passes toward said second mirror; and a second light-intercepting member supporting said second mirror and having an opening through which the light reflected by said third mirror passes toward said second mirror.

* * * * *